(12) United States Patent
Kwon et al.

(10) Patent No.: US 12,087,464 B2
(45) Date of Patent: Sep. 10, 2024

(54) METHOD FOR MANUFACTURING CONDUCTIVE PASTE AND METHOD FOR MANUFACTURING MULTILAYER CERAMIC ELECTRONIC COMPONENT

(71) Applicant: SAMSUNG ELECTRO-MECHANICS CO., LTD., Suwon-si (KR)

(72) Inventors: Tae Gyun Kwon, Suwon-si (KR); Eung Seok Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 100 days.

(21) Appl. No.: 17/721,839

(22) Filed: Apr. 15, 2022

(65) Prior Publication Data
US 2023/0253131 A1    Aug. 10, 2023

(30) Foreign Application Priority Data

Feb. 8, 2022   (KR) .................. 10-2022-0016323

(51) Int. Cl.
*H01B 1/20* (2006.01)
*C09J 9/02* (2006.01)
*H01B 1/02* (2006.01)
*H01B 1/22* (2006.01)
*H01G 4/30* (2006.01)

(52) U.S. Cl.
CPC ................. *H01B 1/22* (2013.01); *H01B 1/02* (2013.01); *H01G 4/302* (2013.01)

(58) Field of Classification Search
CPC ..... C09J 9/02; H01B 1/22; H01B 1/20; H01B 1/00; B22F 7/062; B22F 1/102; C09D 5/24

See application file for complete search history.

(56) References Cited

U.S. PATENT DOCUMENTS

| 7,435,360 B2 * | 10/2008 | Oda ...................... C22C 1/1084 |
| | | 252/512 |
| 2006/0266983 A1 * | 11/2006 | Suzuki .................. H05K 1/092 |
| | | 252/500 |
| 2023/0098422 A1 | 3/2023 | Kwon et al. |

FOREIGN PATENT DOCUMENTS

| JP | 6897278 B2 | 6/2021 |
| KR | 10-2018-0020231 A | 2/2018 |
| KR | 10-2021-0120006 A | 10/2021 |
| KR | 10-2023-0043530 A | 3/2023 |

* cited by examiner

*Primary Examiner* — Haidung D Nguyen
(74) *Attorney, Agent, or Firm* — Morgan, Lewis & Bockius LLP

(57) ABSTRACT

A method for manufacturing a conductive paste includes preparing a first solution including a metal particle and a first solvent, preparing a second solvent, preparing a surfactant including a core particle and an organic material disposed on a surface of the core particle, and mixing the first solution, the second solvent, and the surfactant to form a mixed solution.

28 Claims, 6 Drawing Sheets

METHOD FOR MANUFACTURING CONDUCTIVE PASTE AND METHOD FOR MANUFACTURING MULTILAYER CERAMIC ELECTRONIC COMPONENT

CROSS-REFERENCE TO RELATED APPLICATION(S)

This application claims benefit of priority to Korean Patent Application No. 10-2022-0016323 filed on Feb. 8, 2022 in the Korean Intellectual Property Office, the disclosure of which is incorporated herein by reference in its entirety.

TECHNICAL FIELD

The present disclosure relates to a method for manufacturing a conductive paste and a method for manufacturing a multilayer ceramic electronic component.

BACKGROUND

A multilayer ceramic capacitor, a multilayer ceramic electronic component, is a chip-type condenser mounted on printed circuit boards of various electronic products such as an image apparatus, for example, a liquid crystal display (LCD), a plasma display panel (PDP), or the like, a computer, a smartphone, a cellular phone, and the like, to serve to charge or discharge electricity therein or therefrom.

The multilayer ceramic capacitor (MLCC) has been used as components of various electronic apparatuses since it is relatively small, implements high capacitance, and is easily mounted.

A body of the multilayer ceramic capacitor may be formed by printing a conductive paste for an internal electrode on a ceramic green sheet to form an internal electrode pattern, stacking the ceramic green sheet on which the internal electrode pattern is formed, and then sintering the ceramic green sheet. In this case, the ceramic green sheet may include ceramic powder such as barium titanate (BaTiO3) and an organic binder as main components, and the conductive paste for internal electrodes may include metal powder, a solvent, a binder, a dispersant, and the like.

In this case, when the conductive paste for internal electrodes includes an organic solvent, there may be a problem in that a sheet attack phenomenon in which the organic solvent swells or dissolves the organic binder included in the ceramic green sheet occurs. Such a sheet attack phenomenon may cause a problem in that an insulation of a dielectric layer included in the multilayer ceramic capacitor deteriorates or a rate of occurrence of short circuits increases.

RELATED ART DOCUMENT

Patent Document (Patent Document 1) Korean Patent Laid-Open Publication No. 10-2021-0120006

SUMMARY

An aspect of the present disclosure may prevent a sheet attack phenomenon by providing an emulsion-state conductive paste.

Another aspect of the present disclosure may prevent short circuit defects of a multilayer ceramic electronic component by preventing a sheet attack phenomenon.

However, the object of the present disclosure is not limited to the above description, and may be more easily understood in the course of describing the specific exemplary embodiments in the presently disclosed concept.

According to an aspect of the present disclosure, a method for manufacturing a conductive paste may include preparing a first solution including a metal particle and a first solvent, providing a second solvent, preparing a surfactant including a core particle and an organic material disposed on a surface of the core particle, and mixing the first solution, the second solvent, and the surfactant to form a mixed solution.

According to another aspect of the present disclosure, a method for manufacturing a multilayer ceramic electronic component may include preparing a ceramic green sheet, applying a conductive paste, including a first solution including a metal particle and a first solvent, a second solvent, and a surfactant including a core particle and an organic material disposed on a surface of the core particle, on the ceramic green sheet, forming a ceramic laminate by stacking the ceramic green sheet to which the conductive paste is applied, and sintering the ceramic laminate.

According to an aspect of the present disclosure, a method for manufacturing a conductive paste may include mixing a first solution including a metal particle and a first solvent, a second solvent, and a surfactant to form a mixed solution, wherein at least one of the first and second solvents is a hydrophilic solvent, and the method excludes removing the hydrophilic solvent from the mixed solution.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
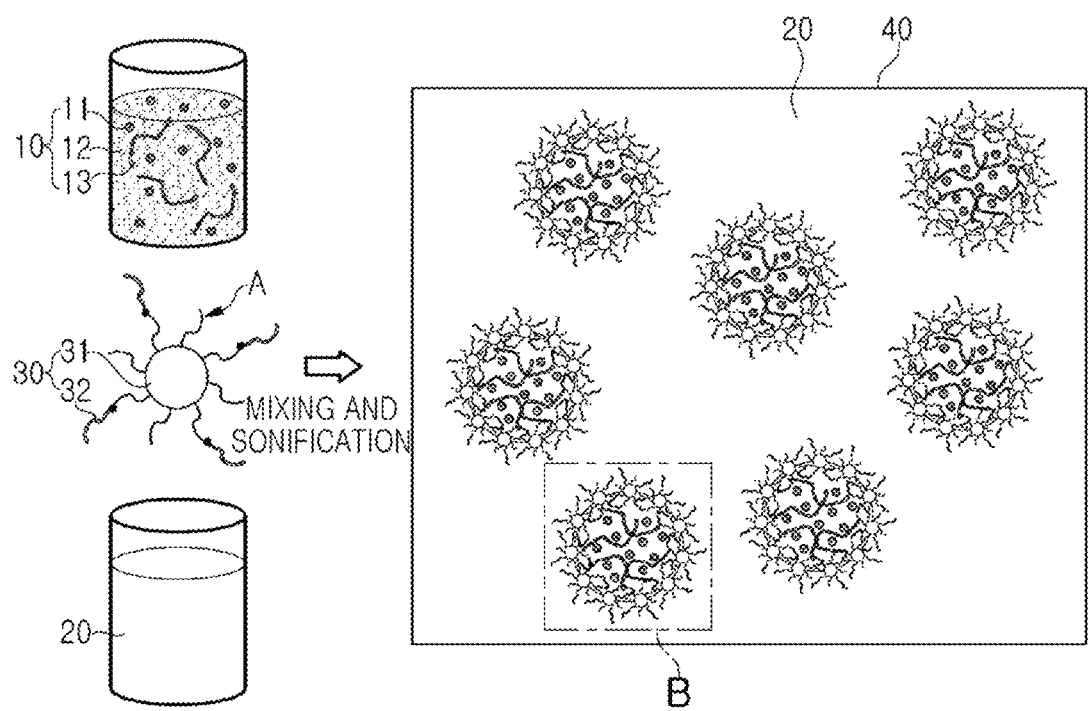
FIG. 1 is a diagram schematically illustrating a method for manufacturing a conductive paste according to an exemplary embodiment in the present disclosure.

Hereinafter, exemplary embodiments in the present disclosure will be described in detail with reference to the accompanying drawings. The exemplary embodiments in the present disclosure may be modified in many different forms and the scope of the disclosure should not be limited to the exemplary embodiments set forth herein. Further, the exemplary embodiments in the present disclosure are provided in order to more fully explain the present disclosure to those skilled in the art. In the drawings, the shapes and dimensions may be exaggerated for clarity, and the same reference numerals will be used throughout to designate the same or like components.

In order to clearly explain the present disclosure in the drawings, parts irrelevant to the description are omitted, and sizes and thicknesses of each component shown in the drawings are arbitrarily indicated for convenience of description, and therefore the present disclosure is not necessarily limited to the illustrated those. Further, like reference numerals will be used to designate like components having similar functions within the scope of the present disclosure. Furthermore, throughout the present specification, unless explicitly described to the contrary, the fact that a part "comprising" a component means that it may further include another component rather than excluding other components.

In the drawings, a first direction may be defined as a length (L) direction, a second direction may be defined as a thickness (T) direction or a stacking direction, and a third direction may be defined as a width (W) direction.

Method for Manufacturing a Conductive Paste

FIG. 1 is a diagram schematically illustrating a method for manufacturing a conductive paste according to an exemplary embodiment in the present disclosure.

Figure 2:
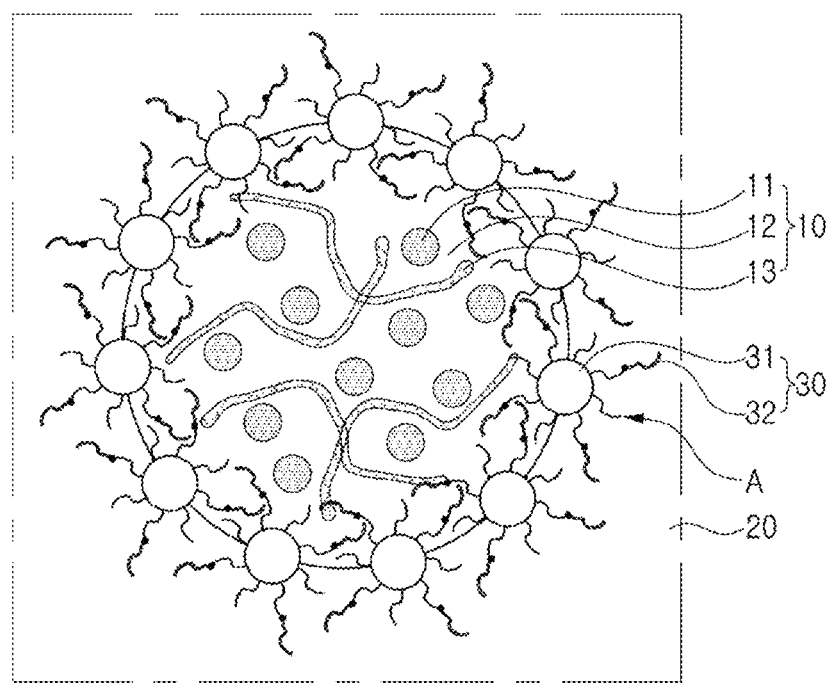
FIG. 2 is an enlarged view illustrating area B of FIG. 1.

FIG. 2 is an enlarged view illustrating area B of FIG. 1.

Figure 3A:
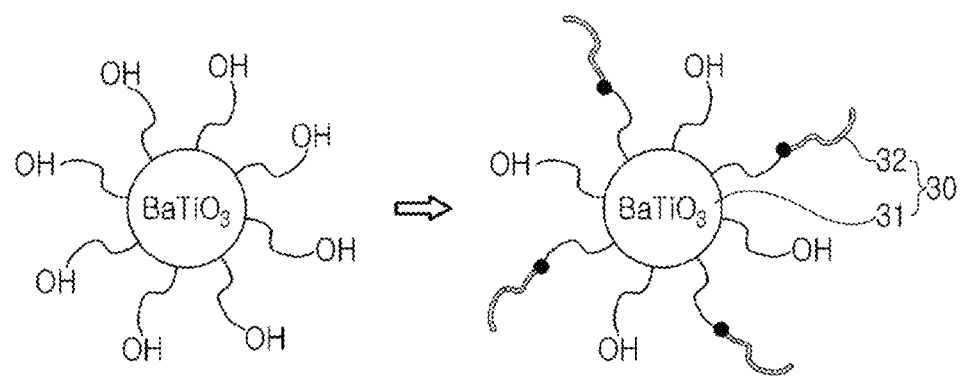
FIG. 3A is a diagram schematically illustrating a process of manufacturing a surfactant including a ceramic particle and FIG. 3B is a diagram schematically illustrating a process of manufacturing a surfactant including a metal particle.
Figure 3B:
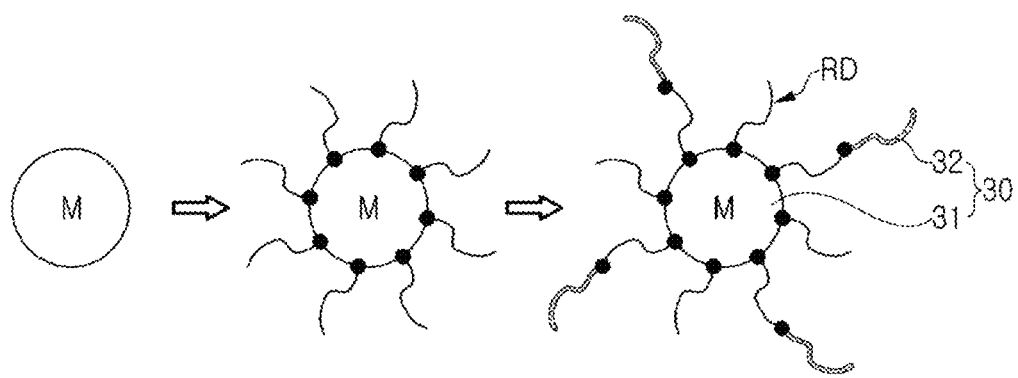

FIG. 3A is a diagram schematically illustrating a process of manufacturing a surfactant including ceramic particles and FIG. 3B is a diagram schematically illustrating a process of manufacturing a surfactant including metal particles.

Figure 4:
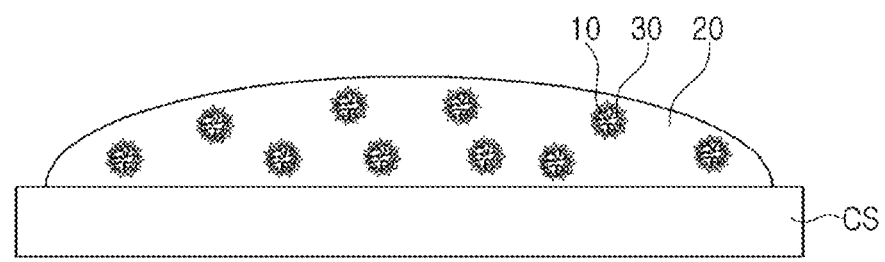
FIG. 4 is a diagram schematically illustrating a ceramic green sheet to which a conductive paste is applied.

FIG. 4 is a diagram schematically illustrating a ceramic green sheet to which a conductive paste is applied.

Hereinafter, a method for manufacturing a conductive paste according to an exemplary embodiment in the present disclosure will be described in detail with reference to FIGS. 1 to 4.

The method for manufacturing a conductive paste according to an exemplary embodiment in the present disclosure includes preparing a first solution 10 including metal particles 11 and a first solvent 12, preparing a second solvent 20, preparing a surfactant 30 including core particles 31 and organic materials 32 formed on a surface of the core particles 31 and the first solution 10, and forming a mixed solution 40 by mixing the first solution 10, the second solvent 20, and the surfactant 30.

The first solution 10 may be formed by adding the metal particles 11 to the first solvent 12. In this case, examples of the metal particles 11 may include nickel (Ni), copper (Cu), palladium (Pd), silver (Ag), gold (Au), platinum (Pt), tin (Sn), tungsten (W), titanium (Ti), and one or more of alloys thereof, and more preferably may include nickel (Ni). In this case, an average diameter of the metal particles 11 included in the first solution 10 may be 150 to 300 nm, but the present disclosure is not limited thereto. The average diameter of the metal particles 11 may be measured by various methods such as a diameter measurement method or an ASTM grain size test method.

In some embodiments, the first solvent or the second solvent may be a hydrophilic solvent. The first solvent 12 may be a hydrophobic solvent, and may include one or more of an acetate-based solvent, a terpene-based solvent, a hydrocarbon-based solvent, a carboxylic acid-based solvent, and an ester-based solvent, but the present disclosure is not limited thereto.

As examples of the acetate-based solvent, dihydroterpinyl acetate, isobornyl acetate, isobornyl propionate, isobornyl butyrate, isobornyl isobutylate, ethylene glycol monobutyl ether acetate, dipropylene glycol methyl ether acetate, and the like may be used. As examples of the terpene-based solvent, terpineol, dihydroterpineol, or the like may be used. Examples of the hydrocarbon-based solvent may include one or more of hexadecane and octadecane. However, the present disclosure is not limited thereto.

The first solution 10 may include a binder 13. The binder 13 refers to an organic component that contributes to improving a bonding property between particles included in the conductive paste. The binder 13 is not limited thereto, but polyvinyl butyral, cellulose-based resin, or the like may be used. A content of the binder 13 is not limited thereto, but may be, for example, 1 to 20 parts by weight based on 100 parts by weight of the metal particles 11. In this case, the first solution 10 may exist in a form in which the metal particles 11 and the binder 13 are uniformly dispersed in the first solvent 12.

The second solvent 20 may be, for example, a hydrophilic solvent, and may be, for example, water ($H_2O$) and/or dimethyl sulfoxide, but the present disclosure is not limited thereto.

The surfactant 30 has an amphiphilic property and may exist at an interface between two immiscible solvents, for example, a hydrophilic solvent and a hydrophobic solvent. For example, the surfactant 30 may exist at the interface between the first solution 10 including the first solvent 12 which is a hydrophobic solvent and the second solvent 20 which is a hydrophilic solvent. In this case, the surfactant 30 exists at the interface between the first solution 10 and the second solvent 20 which are immiscible with each other, so the first solution 10 may be uniformly dispersed in the second solvent 20. Accordingly, the first solution 10, the second solvent 20, and the mixed solution 40 in which the surfactant is mixed may maintain a stabilized emulsion state. Details related to the surfactant 30 will be described later. In some embodiments, the method may exclude removing the hydrophilic solvent from the mixed solution.

The method for manufacturing a conductive paste according to an exemplary embodiment in the present disclosure may further include emulsifying the mixed solution 40 by sonification. By stirring the mixed solution 40 through the sonification, the first solution 10 may be uniformly dispersed in the second solvent 20. Accordingly, the mixed solution 40 may be in an oil in water emulsion state in which the first solution 10 is dispersed in the second solvent 20.

As described above, when the conductive paste includes an organic solvent, a sheet attack phenomenon in which the organic solvent swells or dissolves the organic binder included in a ceramic green sheet CS occurs. Such a sheet attack phenomenon may cause a problem in that an insulation of a dielectric layer included in the multilayer ceramic electronic component deteriorates or a rate of occurrence of short circuits increases.

On the other hand, the conductive paste prepared according to the exemplary embodiment in the present disclosure may exist in the oil in water emulsion state in which the first solution 10 is uniformly dispersed in the second solvent 20. Accordingly, since, for example, the first solvent 12, which is a hydrophobic solvent, does not come into direct contact with the ceramic green sheet CS, even if the conductive paste is applied on the ceramic green sheet CS, the first solvent 12 may not swell or dissolve the organic binder included in the ceramic green sheet CS. Also, for example, even when the second solvent 20, which is a hydrophilic solvent, is in direct contact with the ceramic green sheet CS, the hydrophilic second solvent 20 does not have compatibility with the organic binder included in the ceramic green sheet CS, thereby preventing the sheet attack phenomenon.

Even in the process of drying the conductive paste applied on the ceramic green sheet CS, due to the surfactant 30 present at the interface between the first solution 10 and the second solvent 20, the conductive paste may maintain the emulsion. Accordingly, even in the process of drying and removing the first solvent 12 and the second solvent 20, the metal particles 11, the binder 13, and the surfactant 30 may exist with a phase separated from the ceramic green sheet CS. As a result, the dry coating film of the conductive paste may have the form in which the binder 13 and the surfactant 30 present between aggregates of the plurality of metal particles 11 and the metal particles 11 are uniformly dispersed.

Accordingly, even when the plurality of ceramic green sheets CS applied with the conductive paste are stacked, it is possible to prevent the sheet attack phenomenon to the pre-stacked ceramic green sheets CS.

In an exemplary embodiment, a ratio of a volume of the first solution 10 to a volume of the second solvent 20 may be 1 or less. For example, when the first solvent 12 is a hydrophobic solvent and the second solvent 20 is a hydrophilic solvent, the oil in water emulsion state in which the particles of the first solution 10 are dispersed in the second solvent 20 may be stably maintained when the above conditions are satisfied. A lower limit of the ratio of the volume of the first solution 10 to the volume of the second solvent 20 is not particularly limited, but may be 0.01 or more or 0.1 or more in consideration of the conductivity of the internal electrode.

The surfactant 30 includes the core particles 31 and the organic materials 32 formed on the surfaces of the core particles 31. Here, the core particle 31 is sufficient as long as it includes a binding site A to which the organic material 32 may be bonded, and is not particularly limited, but may include, for example, at least one of the ceramic particle, polymer particle, semiconductor particle, and metal particle. The core particle-organic material type surfactant 30 has properties similar to those of the conventional amphiphilic organic material type surfactant and has the high adsorption energy at the interface between the first solution 10 and the second solvent 20, thereby more stably maintaining the emulsion-state conductive paste, and additionally has properties depending on the type of the core particles 31, thereby performing more various functions than conventional surfactant.

For example, the core particle 31 of the surfactant 30 may include barium titanate ($BaTiO_3$) as the ceramic particle. When the core particle 31 is the ceramic particle, more specifically, barium titanate ($BaTiO_3$), the core particle 31 may act as a co-material for controlling the sintering shrinkage of the metal particle 11 during sintering. That is, the surfactant 30 may act to disperse the metal particle 11 of the first solution 10, and may also act as the co-material during sintering while maintaining the emulsion-state conductive paste.

In addition, when the core particle 31 of the surfactant 30 is, for example, the metal particle, the surfactant 30 may act to disperse the metal particle 11 of the first solution 10, and improve the conductivity of the internal electrode by including the core particle 31 having the electrical conductivity while maintaining the emulsion-state conductive paste. The metal particle as the core particle 31 of the surfactant 30 is not particularly limited, but may include, for example, one or more of gold (Au), silver (Ag), and platinum (Pt).

In addition, when the core particle 31 of the surfactant 30 is the polymer particle, there is an advantage that the core particle 31 may include the binding site A to which the organic material 32 may be bonded, for example, a plurality of hydroxyl groups (—OH), and when the core particle 31 is the semiconductor particle, there is an advantage that the core particle 31 is used in various fields, such as a solar cell, and thus, is easy to use commercially. The semiconductor particle is not particularly limited, but may include, for example, one or more of CdS, CdSe, CdTe, ZnS, ZnSe, ZnTe, ZnO, HgS, HgSe, HgTe, InP, InAs, and InSb.

In this case, the average diameter of the core particles 31 may be 5 to 100 nm. When the average diameter of the core particles 31 exceeds 100 nm, the retention of the emulsion state may be reduced due to the large size of the core particles 31. The average diameter of the core particles may be measured by various methods such as a diameter measurement method or an ASTM grain size test method.

In addition, the shape of the core particle 31 is not particularly limited, and may be, for example, at least one of a cylinder, a square prism, a triangular prism, a pentagonal prism, a hexagonal prism, an octagonal prism, a sphere, a hemisphere, a part of a sphere, an elliptical sphere, a semi-elliptical sphere, a part of an elliptical sphere, a quadrangular pyramid, a quadrangular bipyramid, a quadrilateral truncated pyramid, a triangular pyramid, a triangular bipyramid, a triangular truncated pyramid, a cone, a truncated cone, a ring, and a cube, and the surfactant 30 may have any shape as long as it may have the amphiphilic property.

The plurality of organic materials 32 of the surfactant 30 may be formed on the surfaces of the core particles 31, and the organic materials 32 may be chemically bonded to the core particles 31 through the binding sites A in the core particles 31. In this case, in order to modify the surface of the core particle 31 so that the surfactant 30 has the amphiphilic property, the organic material 32 may include at least one of a hydrophilic organic material, a hydrophobic organic material, and an amphiphilic organic material.

For example, when the core particle 31 has hydrophilicity, the surfactant 30 may have the amphiphilic property by forming the hydrophobic organic material 32 on the surface of the core particle 31, and when the core particle 31 has hydrophobicity, the surfactant 30 may have the amphiphilic property by forming the hydrophilic organic material 32 on the surface of the core particle 31.

More specifically, when the core particle 31 is hydrothermal synthesized barium titanate ($BaTiO_3$), the hydroxyl group (—OH) may be involved in the reaction in the hydrothermal synthesis process. Accordingly, the hydroxyl group may be substituted for an oxygen site in a perovskite crystal structure of barium titanate. Accordingly, the barium titanate may have hydrophilicity as a whole. In this case, the hydroxyl group of the barium titanate may act as the above-described binding site A, and since the hydrophobic organic material capable of being hydrogen bonded to the hydroxyl group is bonded, the core particle-organic material type surfactant 30 may have the amphiphilic property as a whole. The surfactant 30 having the amphiphilic property may exist at the interface between the first solution 10 and the second solvent 20, and may stably maintain the emulsion-state conductive paste. Meanwhile, when the core particle 31 is the polymer particle, the core particle 31 includes the plurality of hydroxyl groups that may act as the binding site, and the hydrophilic organic material, the hydrophobic organic material, and/or the amphiphilic organic material is hydrogen bonded to the hydroxyl group, so the surfactant 30 may have the amphiphilic property.

In addition, when the core particle 31 is a metal particle M, the binding site to which the organic material 32 may be bonded may not exist. In this case, after a ligand RD as the binding site A is chemically bonded to the surface of the core particle 31, the organic material 32 capable of being chemically bonded to the ligand RD may be formed on the surface of the core particle 31. More specifically, after forming a hydrophilic ligand and/or a hydrophobic ligand on the surface of the metal particle M by a wet reduction method using a reducing agent, a plasma process, an arc discharge method, etc., by forming the organic material 32 capable of being chemically bonded to the ligand RD on the surface of the metal particle M, the amphiphilic surfactant 30 may be formed.

Examples of the hydrophilic ligand RD may include one or more of polyethylene glycol, monosaccharide phosphate, citric acid, and betaine. In addition, examples of the hydrophobic ligand RD may include a fatty acid or a fatty acid amine such as caproic acid, stearic acid, oleic acid, oleyl amine, butyl amine, and octyl amine.

When, for example, the hydrophilic ligand RD is formed on the core particle 31, the amphiphilic surfactant 30 may be formed by bonding the hydrophilic ligand and the hydrophobic organic material 32 capable of hydrogen bonding, and when, for example, the hydrophobic ligand RD is formed on the core particle 31, the amphiphilic surfactant 30 may be formed by bonding the hydrophobic ligand and the hydrophilic organic material 32 capable of hydrogen bonding. In addition, after bonding the amphiphilic organic material 32 to the core particle 31, the ligand RD may be dissolved and removed, but the present disclosure is not limited thereto.

The hydrophilic organic material 32 is preferably an organic material capable of hydrogen bonding, and examples of the hydrophilic organic material 32 may include any one or more of polyvinyl alcohol, polyacrylamide, polyethylene glycol, and polyvinylpyrrolidone, but the present disclosure is not limited thereto. In addition, examples of the hydrophobic organic material 32 may include any one or more of polylactide, polycaprolactone, and polypeptide, but the present disclosure is not limited thereto. In addition, examples of the amphiphilic organic material 32 may include sodium dodecyl sulfate, but the present disclosure is not limited thereto.

The core particle-organic material type surfactant 30 may be prepared by chemically bonding the organic material 32 to the core particle 31 through the binding site A in the core particle 31 as described above. For example, the core particle-organic material type surfactant 30 may be formed by adding the organic material 32 to the solution in which the core particles 31 are dissolved and being heated to a constant temperature, but the present disclosure is not limited thereto. In this case, the surfactant 30 may be included in an amount of 0.1 to 25 parts by weight based on 100 parts by weight of the second solvent 20, but the present disclosure is not limited thereto.

Figure 5A:
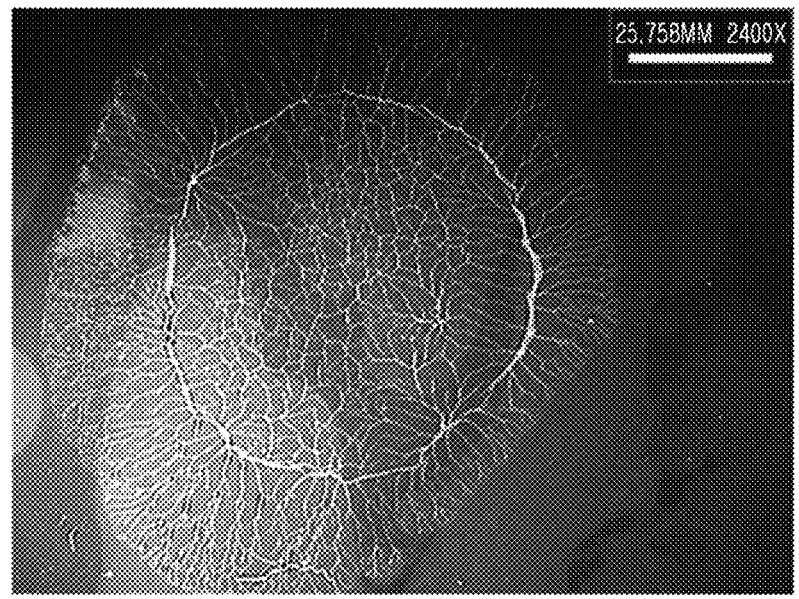
FIG. 5A is an image of a ceramic green sheet applied with a conductive paste prepared according to Comparative Example of the present disclosure taken with an optical microscope and FIG. 5B is an image of a ceramic green sheet applied with the conductive paste prepared according to an exemplary embodiment in the present disclosure taken with an optical microscope.
Figure 5B:
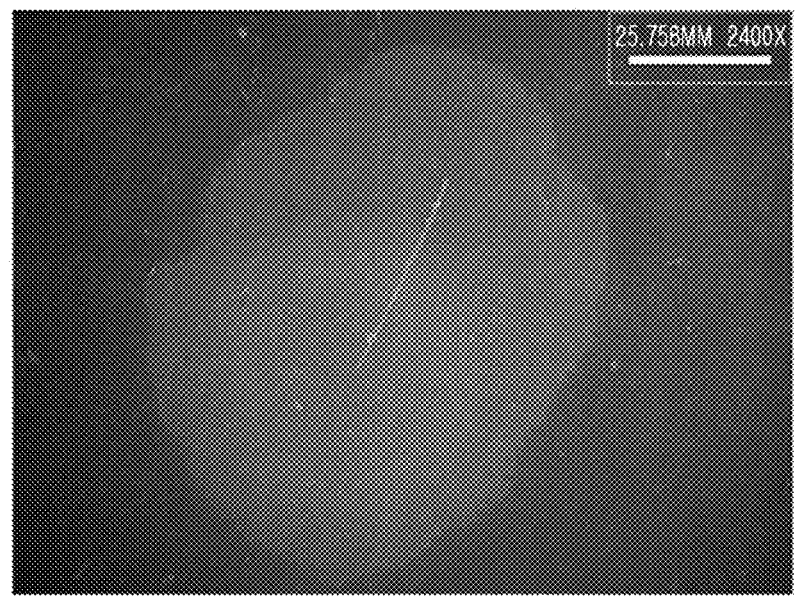

FIG. 5A is an image of a ceramic green sheet applied with a conductive paste prepared according to Comparative Example of the present disclosure taken with an optical microscope and FIG. 5B is an image of a ceramic green sheet applied with the conductive paste prepared according to an exemplary embodiment in the present disclosure taken with an optical microscope. In Comparative Example of the present disclosure, a conductive paste in which metal particles are dispersed in a hydrophobic organic solvent is applied on a ceramic green sheet.

Referring to FIG. 5, in the case of the ceramic green sheet applied with the conductive paste prepared according to Comparative Example, it may be confirmed that the sheet attack phenomenon occurs. This is because, in the case of Comparative Example including only the organic solvent, the organic solvent swells or dissolves the organic binder included in the ceramic green sheet. On the other hand, in the case of the ceramic green sheet applied with the conductive paste prepared according to the exemplary embodiment in the present disclosure, it may be confirmed that the sheet attack phenomenon does not occur. This is because the first solvent, which is the hydrophobic solvent, does not directly contact the ceramic green sheet, and the second solvent, which is the hydrophilic solvent which is not compatible with the organic binder included in the ceramic green sheet, directly contacts the ceramic green sheet, thereby preventing the sheet attack phenomenon.

Method for Manufacturing a Multilayer Ceramic Electronic Component

The conductive paste prepared according to an exemplary embodiment in the present disclosure may be used for manufacturing an internal electrode of a multilayer ceramic electronic component.

Figure 6:
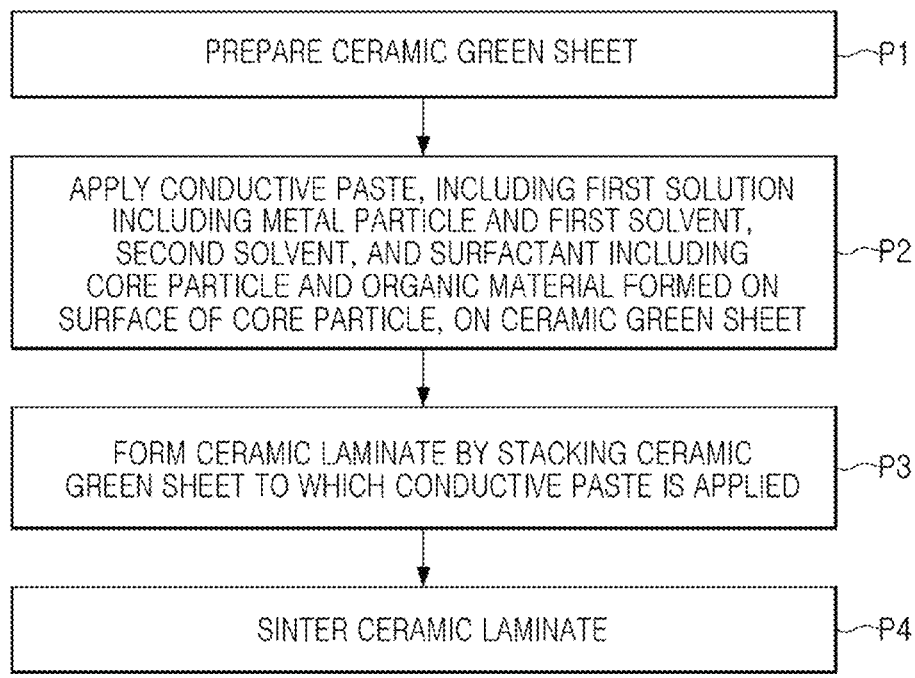
FIG. 6 is a process flowchart illustrating a process of manufacturing a multilayer ceramic electronic component according to an exemplary embodiment in the present disclosure.

FIG. 6 is a process flowchart illustrating a process of manufacturing a multilayer ceramic electronic component according to an exemplary embodiment in the present disclosure.

Figure 7:
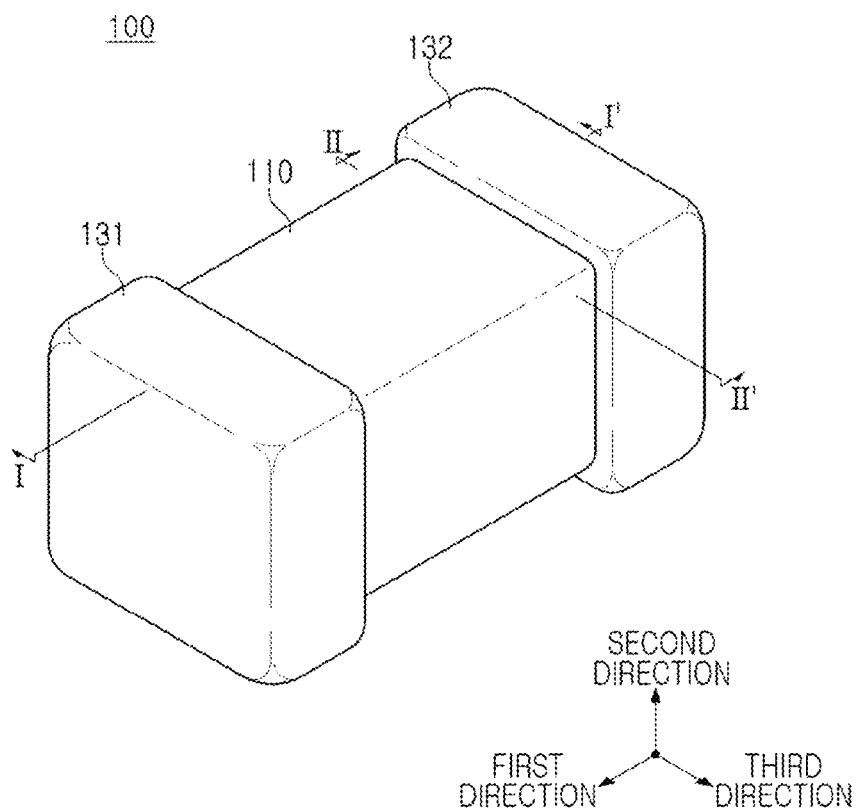
FIG. 7 is a perspective view schematically illustrating a multilayer ceramic electronic component manufactured according to an exemplary embodiment in the present disclosure.

FIG. 7 is a perspective view schematically illustrating a multilayer ceramic electronic component manufactured according to an exemplary embodiment in the present disclosure.

Figure 8:
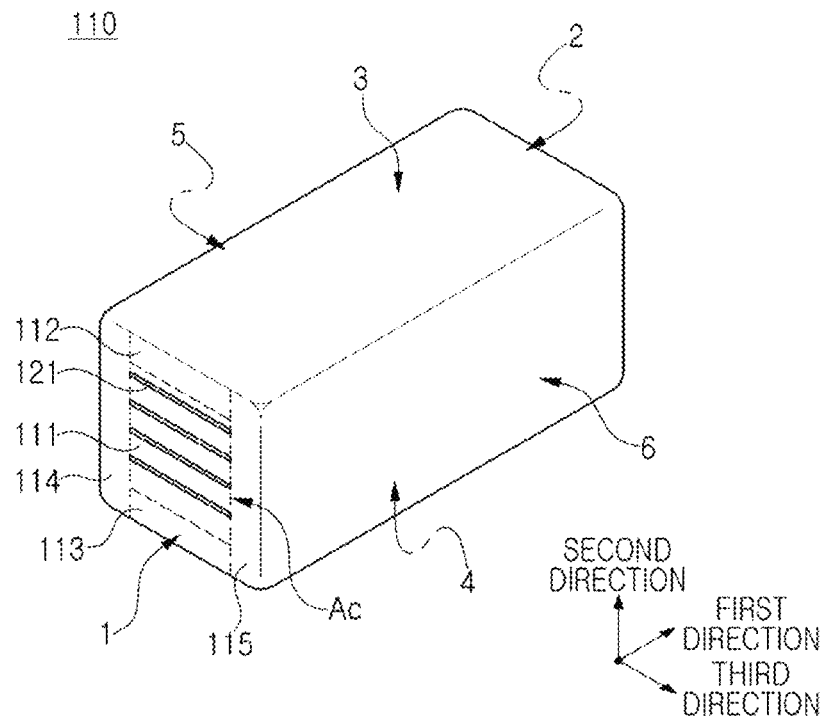
FIG. 8 is a perspective view schematically illustrating a body of the multilayer ceramic electronic component.

FIG. 8 is a perspective view schematically illustrating a body of the multilayer ceramic electronic component.

Figure 9:
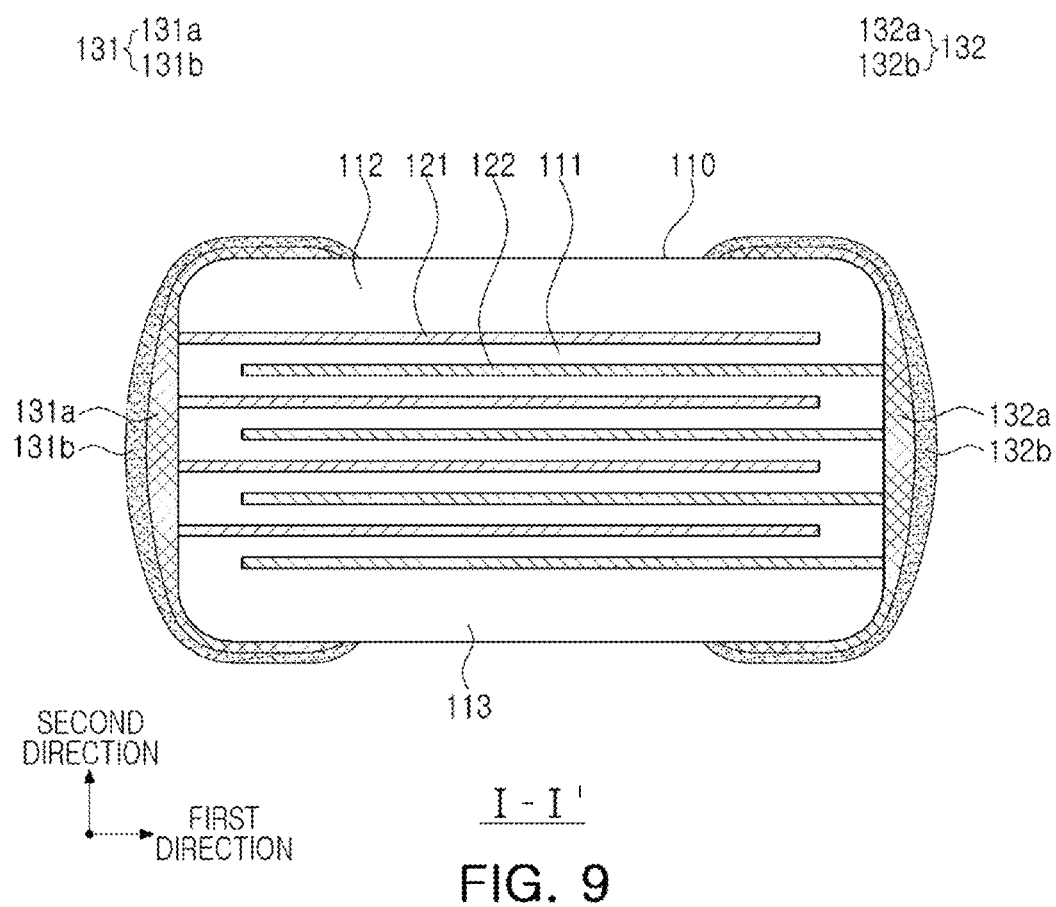
FIG. 9 is a cross-sectional view schematically illustrating a cross section taken along I-I' of FIG. 7.

FIG. 9 is a cross-sectional view schematically illustrating a cross section taken along I-I' of FIG. 7.

Figure 10:
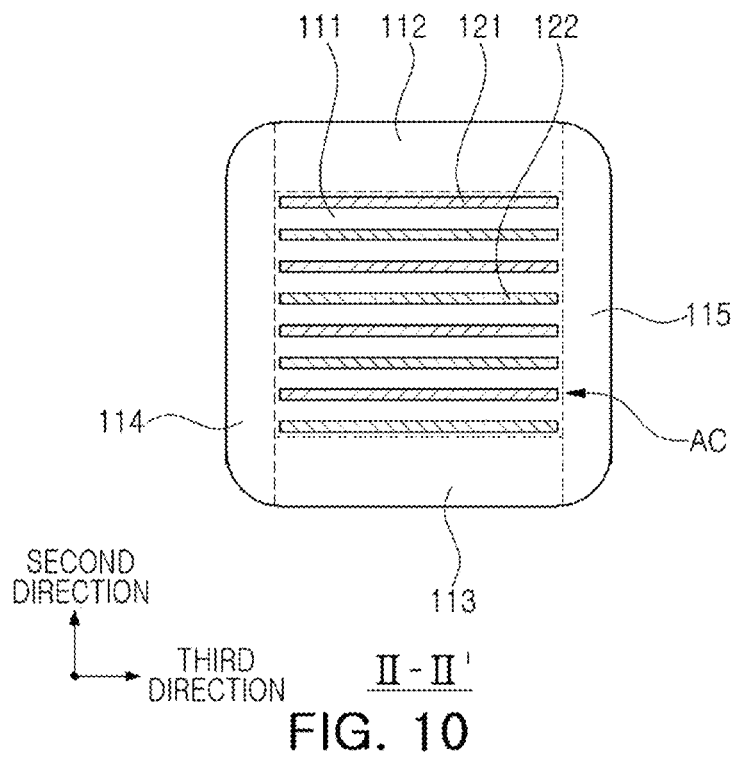
FIG. 10 is a cross-sectional view schematically illustrating a cross section taken along II-II' of FIG. 7.

FIG. 10 is a cross-sectional view schematically illustrating a cross section taken along II-II' of FIG. 7.

Referring to FIGS. 6 to 10, a method for manufacturing a multilayer ceramic electronic component according to an exemplary embodiment in the present disclosure includes preparing a ceramic green sheet (P1), applying a conductive paste, including a first solution including a metal particle and a first solvent, a second solvent, and a surfactant including a core particle and an organic material formed on a surface of the core particle, on the ceramic green sheet (P2), forming a ceramic laminate by stacking the ceramic green sheet to which the conductive paste is applied (P3), and sintering the ceramic laminate (P4).

Hereinafter, the method for manufacturing a multilayer ceramic electronic component according to an exemplary embodiment in the present disclosure will be described in detail for each step.

First, a ceramic green sheet including ceramic powder is prepared (P1). The ceramic green sheet may be manufactured by mixing ceramic powders, a binder, a solvent, and the like, with one another to prepare slurry and manufacturing the slurry in a sheet shape having a thickness of several micrometers by a doctor blade method. The ceramic green sheet may be sintered to form one dielectric layer 111.

The average thickness of the ceramic green sheet may be 0.6 μm or less, and the average thickness of the dielectric layer 111 after sintering may be 0.4 μm or less. In the case of the method for manufacturing a multilayer ceramic electronic component according to an exemplary embodiment in the present disclosure, it is possible to prevent the sheet attack phenomenon even when the ceramic green sheet has a very thin thickness by applying the emulsion-state conductive paste on the ceramic green sheet and it is possible to prevent a short circuit from occurring due to contact between a first internal electrode 121 and a second internal electrode 122 stacked with one dielectric layer 111 having a thin thickness therebetween.

Next, the first solution 10 that includes the metal particle 11 and the first solvent 12, the second solvent 20, and the surfactant 30 including the core particle 31 and the organic material 32 formed on the surface of the core particle 31 may be applied on the ceramic green sheet (P2).

In this case, the first solvent 12 may be a hydrophobic solvent, and the second solvent 20 may be a hydrophilic solvent. That is, as described above, the conductive paste may be in the oil in water emulsion state in which the first solution 10 including the hydrophobic solvent is dispersed in the second solvent 20 that is the hydrophilic solvent.

Accordingly, since, for example, the first solvent 12, which is the hydrophobic solvent, does not come into direct contact with the ceramic green sheet, even if the conductive paste is applied on the ceramic green sheet, the first solvent 12 may not swell or dissolve the organic binder included in the ceramic green sheet. Also, even if the second solvent 20 is in direct contact with the ceramic green sheet, the hydrophilic second solvent 20 does not have compatibility with the organic binder included in the ceramic green sheet, thereby preventing the sheet attack phenomenon.

Accordingly, even if the ceramic green sheets applied with the conductive paste are stacked plural times, it is possible to prevent the sheet attack phenomenon to the pre-stacked ceramic green sheets.

Next, the ceramic green sheet to which the conductive paste is applied may be stacked to form a ceramic laminate (P3).

In this case, the ceramic laminate may be compressed by pressing the stacking direction. In addition, the ceramic laminate may be cut into an area corresponding to one electronic component to be formed in a chip form.

Next, the ceramic laminate may be sintered (P4) That is, the body 110 including the dielectric layer 111 and the internal electrodes 121 and 122 may be formed by sintering the ceramic laminate cut into an area corresponding to one electronic component.

The sintering process may be performed in a reducing atmosphere. In addition, the sintering process may be performed while controlling a temperature raising speed. The temperature raising speed may be 30° C./60 s to 50° C./60 s at 700° C. or lower.

Next, external electrodes 131 and 132 connected to the internal electrodes 121 and 122 may be formed on the outside of the body 110. A method of forming the external electrodes 131 and 132 is not particularly limited, but may include a method for dipping a body 110 into a conductive paste for external electrodes including a conductive metal and a glass component, a method for transferring a sheet including a conductive metal and a glass component, or a method for applying and curing a conductive paste for external electrodes including a conductive metal and a resin component, or the like.

A method for manufacturing a multilayer ceramic electronic component according to another exemplary embodiment in the present disclosure may have the same configuration as in the exemplary embodiments in the conductive paste according to the exemplary embodiment in the present disclosure described above. Therefore, the description overlapping with the above-described exemplary embodiment in the present disclosure will be omitted.

Multilayer Ceramic Electronic Component

A multilayer ceramic electronic component 100 manufactured by the method for manufacturing a multilayer ceramic electronic component according to an exemplary embodiment in the present disclosure described above includes the body 110 including the dielectric layer 111 and the internal electrodes 121 and 122 and the external electrodes 131 and 132 disposed outside the body 110.

The shape of the body 110 is not particularly limited, but may be a hexahedral shape or a shape similar to the hexahedral shape, as illustrated. Although the body 110 does not have a hexahedral shape having perfectly straight lines due to shrinkage of ceramic powders included in the body 110 or polishing of an edge portion in the sintering process, the body 110 may have substantially the hexahedral shape.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first to fourth surfaces 1, 2, 3, and 4 and opposing each other in a third direction.

The body 110 may include the dielectric layers 111 and the internal electrodes 121 and 122 alternately stacked therein. The plurality of dielectric layers 111 forming the body 110 may be in a sintered state, and adjacent dielectric layers 111 may be integrated with each other so that boundaries therebetween are not readily apparent without using a scanning electron microscope (SEM).

In this case, an average thickness of the dielectric layer 111 may be 0.4 μm or less. The average thickness of the dielectric layer 111 may be measured by scanning the cross sections of the body 110 in the first direction and the second direction with a scanning electron microscope at a magnification of 10,000. More specifically, the average value may be measured by measuring the thickness at a plurality of points of one dielectric layer 111, for example, at 30 points equally spaced in the first direction. In addition, when the average value is measured by extending the measurement of the average value to the plurality of dielectric layers 111, the average thickness of the dielectric layer 111 may be more generalized.

The body 110 may include a capacitance formation portion Ac that is disposed inside the body 110 and includes the plurality of first internal electrodes 121 and the plurality of second internal electrodes 122 disposed to face each other with the dielectric layer 111 interposed therebetween to form a capacitance, a first cover portion 112 that is disposed on an upper portion of the capacitance formation portion Ac, and a second cover portion 113 disposed on a lower portion of the capacitance formation portion Ac. The first cover portion 112 and the second cover portion 113 may be formed by stacking a single dielectric layer or two or more dielectric layers on the upper and lower surfaces of the capacitance formation portion Ac, respectively, in the second direction, and may basically serve to prevent damage to the internal electrodes due to physical or chemical stress.

The body 110 may further include margin portions 114 and 115 disposed on side surfaces of the capacitance forming portion Ac in the third direction. The margin portions 114 and 115 may include a first margin portion 114 disposed on a fifth surface 5 of the body 110 and a second margin portion 115 disposed on a sixth surface 6 of the body 110. The margin portions 114 and 115 may refer to an area between both ends of the internal electrodes 121 and 122 and the interface of the body 110 in a cross section of the body 110 cut in the second and third directions. The margin portions 114 and 115 may basically serve to prevent damage to the internal electrodes 121 to 122 due to physical or chemical stress. The margin portions 114 and 115 may be formed by forming the internal electrodes by applying the conductive paste on the ceramic green sheet except where the margin portion is to be formed. Alternatively, after the stacking, the internal electrodes 121 and 122 are cut to be exposed to the fifth and sixth surfaces 5 and 6 of the body, and then a single dielectric layer or two or more dielectric layers may be formed by being stacked on both side surfaces of the capacitance formation portion Ac in the third direction.

The internal electrodes 121 and 122 may be alternately disposed with the dielectric layer 111, and the plurality of first internal electrodes 121 and the plurality of second internal electrodes 122 may be disposed to face each other with the dielectric layer 111 interposed therebetween. For example, each of the plurality of first internal electrodes 121 may be spaced apart from the second surface 2 and exposed through the first surface 1. In addition, each of the plurality of second internal electrodes 122 may be spaced apart from the first surface 1 and exposed through the second surface 2. The plurality of first and second internal electrodes 121 and 122 may be electrically separated from each other by the dielectric layer 111 interposed therebetween. The conductive metal included in the internal electrodes 121 and 122 may include nickel (Ni), copper (Cu), palladium (Pd), silver (Ag), gold (Au), platinum (Pt), tin (Sn), tungsten (W), titanium (Ti), and one or more of alloys thereof, and the present disclosure is not limited thereto.

In this case, an average thickness of the internal electrodes 121 and 122 may be 0.4 μm or less. The average thickness of the internal electrodes 121 and 122 may be measured by scanning the end surfaces of the body 110 in the first direction and the second direction with a scanning electron microscope at a magnification of 10,000. More specifically, the average value may be measured by measuring the thickness at a plurality of points of one internal electrode, for example, at 30 points equally spaced in the first direction. When an average thickness of ten or more internal electrodes is measured, the average thickness of the internal electrode may be further generalized.

The external electrodes 131 and 132 may be disposed on the first and second surfaces 1 and 2 of the body 110 and may partially extend to the third, fourth, fifth, and sixth surfaces 3, 4, 5, and 6, respectively. The external electrodes 131 and 132 may include the first external electrode 131 and the second external electrode 132 connected to the plurality of first internal electrodes 121 and the plurality of second internal electrodes 122, respectively.

The external electrodes 131 and 132 may be formed of any material having electrical conductivity, such as a metal, or the like, a certain material of each of the external electrodes 131 and 132 may be determined in consideration of electrical characteristics, structural stability, or the like, and the external electrodes 131 and 132 may have a multilayer structure. For example, the external electrodes 131 and 132 may include first electrode layers 131a and 132a disposed on the body 110 and second electrode layers 131b and 132b disposed on the first electrode layer.

The first electrode layers 131a and 132a may be sintered electrodes including a conductive metal and glass, or may be resin-based electrodes including a conductive metal and a resin. Here, the resin may use an insulating resin, and for example, may include an epoxy resin, but the present disclosure is not limited thereto. The conductive metal included in the first electrode layers 131a and 132a may include copper (Cu), nickel (Ni), palladium (Pd), platinum (Pt), gold (Au), silver (Ag), lead (Pb), and/or an alloy including the same, or the like, and may preferably include copper (Cu) and/or nickel (Ni), but is not limited thereto.

The type of the second electrode layers 131b and 132b is not particularly limited, and may be a plating layer including nickel (Ni), tin (Sn), palladium (Pd) and/or an alloy containing the same, and may be formed of a plurality of layers. The second electrode layers 131b and 132b may be, for example, a nickel (Ni) plating layer or a tin (Sn) plating layer, or the nickel (Ni) plating layer and the tin (Sn) plating layer may be sequentially formed. In addition, the second electrode layers 131b and 132b may include the plurality of nickel (Ni) plating layers and/or the plurality of tin (Sn) plating layers.

As set forth above, according to an exemplary embodiment in the present disclosure, it is possible to prevent a sheet attack phenomenon by providing an emulsion-state conductive paste.

In addition, it is possible to prevent short circuit defects of a multilayer ceramic electronic component by preventing a sheet attack phenomenon.

While the present disclosure has been shown and described in connection with the exemplary embodiments, it will be apparent to those in the art that modifications and variations can be made without departing from the spirit and scope of the disclosure as defined by the appended claims. Accordingly, various types of substitutions, modifications and changes will be possible by those of ordinary skill in the art without departing from the presently disclosed concept described in the claims, and belong to the scope of the presently disclosed concept.

In addition, the term "exemplary embodiment" used herein does not refer to the same exemplary embodiment, and is provided to emphasize a particular feature or characteristic different from that of another exemplary embodiment. However, exemplary embodiments provided herein are considered to be able to be implemented by being combined in whole or in part one with another. For example, one element described in a particular exemplary embodiment, even if it is not described in another exemplary embodiment, may be understood as a description related to another exemplary embodiment, unless an opposite or contradictory description is provided therein.

What is claimed is:

1. A method for manufacturing a conductive paste, comprising:
   preparing a first solution including a metal particle and a first solvent;
   preparing a second solvent;
   preparing a surfactant including a core particle and an organic material bonded to a surface of the core particle; and
   mixing the first solution, the second solvent, and the surfactant to form a mixed solution, wherein one solvent among the first solvent and the second solvent is a hydrophobic solvent, and the other solvent is a hydrophilic solvent.

2. The method of claim 1, further comprising:
emulsifying the mixed solution by sonication.

3. The method of claim 1, wherein the first solvent is the hydrophobic solvent, and the second solvent is the hydrophilic solvent.

4. The method of claim 1, wherein a ratio of a volume of the first solution to a volume of the second solvent is 1 or less.

5. The method of claim 1, wherein the core particle includes at least one of a ceramic particle, a polymer particle, a semiconductor particle, and a metal particle.

6. The method of claim 5, wherein the ceramic particle of the surfactant includes barium titanate ($BaTiO_3$).

7. The method of claim 5, wherein the metal particle of the surfactant includes at least one of gold (Au), silver (Ag), and platinum (Pt).

8. The method of claim 1, wherein the organic material includes at least one of a hydrophilic organic material, a hydrophobic organic material, and an amphiphilic organic material.

9. The method of claim 1, wherein an average diameter of the core particle is 5 to 100 nm.

10. The method of claim 1, wherein the hydrophilic solvent is water.

11. The method of claim 1, wherein the conductive paste is in an oil in water emulsion state.

12. A method for manufacturing a multilayer ceramic electronic component, comprising:
preparing a ceramic green sheet;
performing the method of claim 1 to manufacture the conductive paste;
applying the conductive paste on the ceramic green sheet;
forming a ceramic laminate by stacking the ceramic green sheet to which the conductive paste is applied; and
sintering the ceramic laminate.

13. The method of claim 12, wherein the first solvent is the hydrophobic solvent, and the second solvent is the hydrophilic solvent.

14. The method of claim 12, wherein the conductive paste is in an oil in water emulsion state.

15. The method of claim 12, wherein the core particle includes at least one of a ceramic particle, a polymer particle, a semiconductor particle, and a metal particle.

16. The method of claim 15, wherein the ceramic particle of the surfactant includes barium titanate ($BaTiO_3$).

17. The method of claim 15, wherein the metal particle of the surfactant includes at least one of gold (Au), silver (Ag), and platinum (Pt).

18. The method of claim 12, wherein the organic material includes at least one of a hydrophilic organic material, a hydrophobic organic material, and an amphiphilic organic material.

19. A method for manufacturing a conductive paste, comprising:
preparing a first solution including a metal particle and a first solvent;
preparing a second solvent;
preparing a surfactant including a core particle and an organic material bonded to a surface of the core particle; and
mixing the first solution, the second solvent, and the surfactant to form a mixed solution; and
emulsifying the mixed solution by sonication.

20. The method of claim 19, wherein the first solvent is the hydrophobic solvent, and the second solvent is the hydrophilic solvent.

21. The method of claim 19, wherein a ratio of a volume of the first solution to a volume of the second solvent is 1 or less.

22. The method of claim 19, wherein the core particle includes at least one of a ceramic particle, a polymer particle, a semiconductor particle, and a metal particle.

23. The method of claim 19, wherein the organic material includes at least one of a hydrophilic organic material, a hydrophobic organic material, and an amphiphilic organic material.

24. The method of claim 22, wherein the ceramic particle of the surfactant includes barium titanate ($BaTiO_3$).

25. The method of claim 22, wherein the metal particle of the surfactant includes at least one of gold (Au), silver (Ag), and platinum (Pt).

26. The method of claim 25, wherein an average diameter of the core particle is 5 to 100 nm.

27. A method for manufacturing a conductive paste, comprising:
preparing a first solution including a metal particle and a first solvent;
preparing a second solvent;
preparing a surfactant including a core particle and an organic material bonded to a surface of the core particle; and
mixing the first solution, the second solvent, and the surfactant to form a mixed solution,
wherein the first solvent is the hydrophobic solvent, and the second solvent is the hydrophilic solvent,
wherein a ratio of a volume of the first solution to a volume of the second solvent is 1 or less, and
wherein the core particle includes at least one of gold (Au), silver (Ag), and platinum (Pt).

28. The method of claim 27, wherein the organic material includes at least one of a hydrophilic organic material, a hydrophobic organic material, and an amphiphilic organic material.

* * * * *